Patented Dec. 21, 1926.

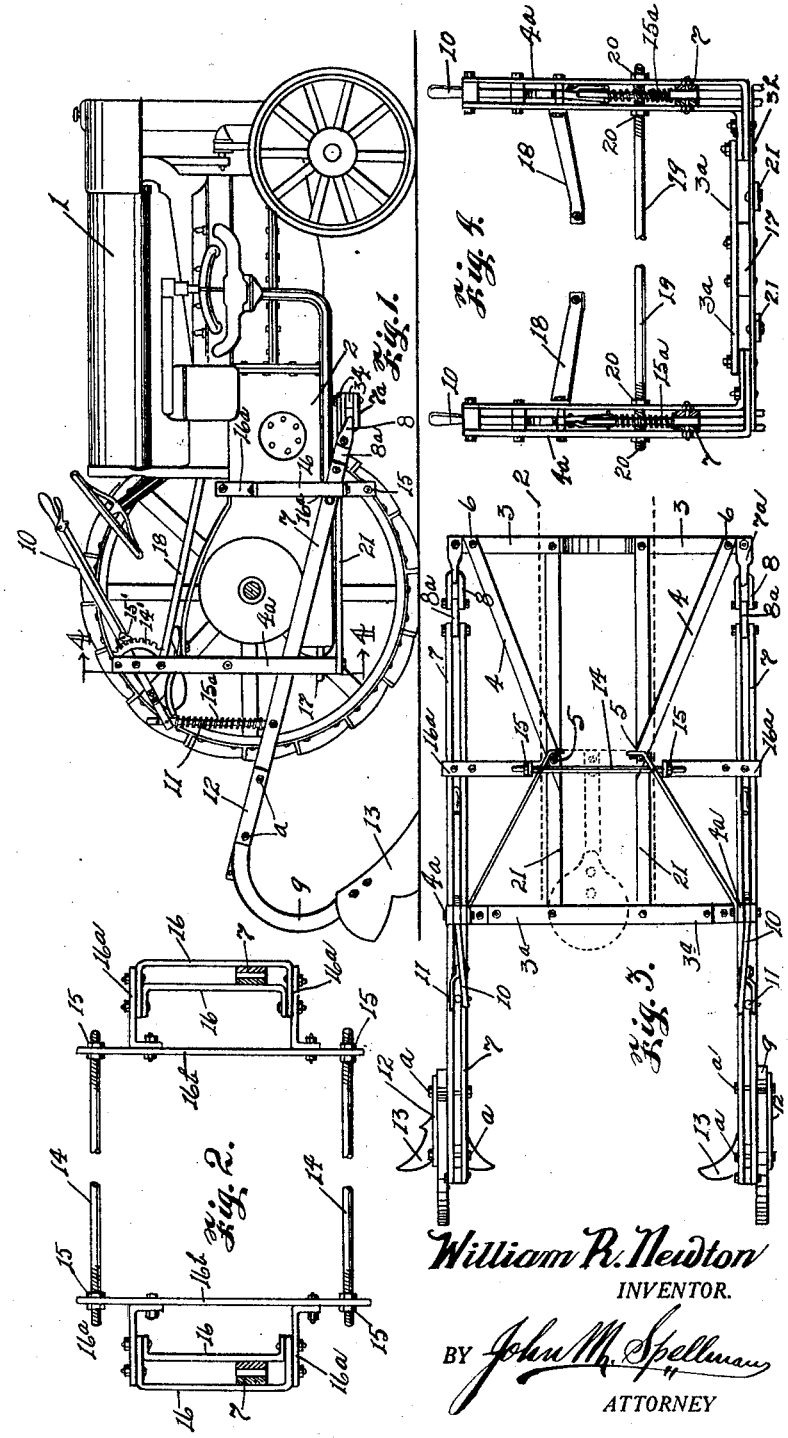

1,611,484

UNITED STATES PATENT OFFICE.

WILLIAM R. NEWTON, OF HILLSBORO, TEXAS.

PLOW ATTACHMENT FOR TRACTORS.

Application filed January 5, 1924. Serial No. 684,470.

This invention relates to agricultural machinery and refers more particularly to plow attachments for tractors used in agricultural pursuits.

An object of the invention is to provide a plow which may be operated by a pushing action of the tractor upon the plow beam.

A further object is the provision of an attachment which will be adjustable vertically and horizontally.

Another particular feature and advantage of the invention is brought out in the method of attaching the plows, which allow them to pivot upwardly from the beam to move over bumps and obstacles on the surface of the ground. This arrangement is such that should the plow come in contact with such obstacles, the plow will pivot upwardly, thus averting the danger of injuring the plow share.

A still further object is the attachment of the plow beams directly adjacent the point where the force or pushing members attach to the frame.

Other advantages and features will become apparent from the following detailed explanation, taken in connection with the annexed drawings, and in which:

Figure 1 represents a side view of the invention in position upon a tractor.

Figure 2 shows a cross-sectional view of the plow beam guiding frame.

Figure 3 is a plan view of the invention and

Figure 4 is an elevational view, partly in section, taken at points 4—4 on Figure 1.

In the figures; the tractor 1 with transmission housing 2, has, in adjustable attachment thereto, frame side members 16ᵇ with outwardly extending brackets 16ᵃ at the top and bottom. These side members are adjustably connected to the transmission housing by rods 14 provided with threaded ends bearing the lock nuts 15. Secured to the brackets 16ᵃ are the spaced vertically extending bars 16 which provide guideways for the plow beams 7 whereby the latter may move vertically therein.

These plow beams 7 are each connected at their forward ends to a link joint 8ᵃ which in turn is fastened to member 8, said member being engaged by member 7ᵃ at each extremity of the cross-member 3. This member passes under the transmission housing 2.

Upright members 4ᵃ support a lever control mechanism for the plow beams which will be described more fully hereinafter and are retained in spaced relation by means of the cross bar 19 having threaded ends bearing the lock nuts 20.

The plow beams are movable on a pivot formed by their connection to the cross member 3 in a vertical direction or adjustable laterally by adjustment of the rods 19 and lock nuts 20—20 thereon.

The tongue 17 of the tractor 1 has bolted or otherwise suitably fastened thereto, the members 3ᵃ and 3ᵇ which support the upright portions 4ᵃ to which the lever mechanism is attached. Longitudinally extending bars 21 connect the bars 3ᵃ and 3ᵇ and brace rods 4 are also attached, as at 5 and 6, to the bars 3 and 21. This lever mechanism will now be described.

The levers 10—10, pivoted in the frame 4ᵃ, may be depressed to lift rods 11—11 to raise the beams 7—7. These rods 11—11 are attached to the levers 10—10 by passing through a swivel thimble in lever 10—10 allowing beams 7—7 to press upwardly against springs 15ᵃ, thus securing a furrow of even depth when the tractor wheels are passing over uneven ground. Pawls 15′ and ratchets 14′ are provided for retaining the levers in their adjusted positions. The plow shares 13—13 are bolted to the plow standard 9—9.

Braces 18—18 form a stiffening means for the uprights 4ᵃ—4ᵃ.

In operation, the tractor literally pushes the plows along because the forward motion is applied to the members 21—21 which in turn apply this motion or force to the member 3. This member pulls the plow beams 7—7 and the plow shares attached thereto. In short, the construction is such that the device is in adjustable attachment to the tractor tongue or hitch and the transmission housing and is adjustable to move the plow shares in respect to their relative positions laterally, and whereby they may be raised at will.

Methods of attaching the device and formations of the different members may be varied somewhat without departing from the spirit and intent of the following claims:

I claim:

1. In an attachment for tractors, a rear frame having sides, spaced vertical guides forming part of said sides, a cross member in attachment to the lower extremities of said sides and in attachment to the hitch tongue of the tractor, suitable braces secured to said sides and to the body of the tractor, another frame having sides, and spaced forwardly of said rear frame, spaced vertical guides forming part of said sides, and means for securing said sides against the body of the tractor, a transverse frame member secured beneath the body of the tractor and forwardly of said other frame, said transverse frame member being suitably attached and braced to the rear frame; implement attachment bars pivotally connected to said frame member and adapted to extend rearwardly therefrom, thru said vertical guides in said frames, and means for effecting vertical adjustment of said bars.

2. The combination, with a vehicle having a draft member, of a rear frame, spaced substantially vertical guides on the sides of said frame, a cross member connected with lower parts of said frame and with said draft member, braces secured to said frame and to said vehicle, a front frame connected with said vehicle, spaced substantially vertical guides on the sides of said front frame, a transverse frame member secured beneath the body of said vehicle, implement attachment members swingably connected with said frame member and extending rearwardly through the guides on said frames, and means for effecting vertical adjustment of said implement attachment members.

In testimony whereof I have signed my name to this specification.

WILLIAM R. NEWTON.